United States Patent

[11] 3,567,869

[72] Inventors Akira Hirota
Chigasaki;
Keiichi Sekine; Junichi Ura, Yokohama, Japan
[21] Appl. No. 710,907
[22] Filed Mar. 6, 1968
[45] Patented Mar. 2, 1971
[73] Assignee Victor Company of Japan Limited
Yokohama, Japan
[32] Priority Mar. 7, 1967
[33] Japan
[31] 13920

[54] MAGNETIC RECORDING AND REPRODUCING APPARATUS WITH ROTATING HEAD INCLINATION AND HEIGHT-ADJUSTING MEANS
1 Claim, 10 Drawing Figs.

[52] U.S. Cl. ........................................................ 179/100.2,
178/6.6
[51] Int. Cl. ........................................................ G11b 5/52,
G11b 21/24, H04n 1/24
[50] Field of Search ........................................ 179/100.2
(T), 100.2 (CA)

[56] References Cited
UNITED STATES PATENTS

| | | | |
|---|---|---|---|
| 3,418,424 | 12/1968 | Takayanagi .................. | 179/100.2 |
| 3,376,395 | 4/1968 | Rumple ........................ | 179/100.2 |
| 3,375,331 | 3/1968 | Okazaki ....................... | 179/100.2 |

*Primary Examiner*—J. Russell Goudeau
*Attorney*—Louis Bernat

ABSTRACT: A magnetic recording and reproducing apparatus has a rotating member, provided with magnetic heads, in a cylindrical magnetic tape guide member assembly. A magnetic tape travels over the guide obliquely relative to the axis of rotation of said rotating member to successively record or reproduce high-frequency signals such as television video signals in oblique tracks. The apparatus permits the matching of tracks on the magnetic tape by adjusting the angle of inclination of the axis of rotation of the rotating member and the height of the rotating member.

INVENTORS.
AKIRA HIROTA
KEIICHI SEKINE
JUNICHI URA

BY Louis Bernat
ATTORNEY

INVENTORS.
AKIRA HIROTA
KEIICHI SEKINE
JUNICHI URA

BY Louis Bernat

ATTORNEY

INVENTORS.
AKIRA HIROTA
KEIICHI SEKINE
JUNICHI URA

BY Louis Bernat
ATTORNEY

MAGNETIC RECORDING AND REPRODUCING APPARATUS WITH ROTATING HEAD INCLINATION AND HEIGHT-ADJUSTING MEANS

This invention relates to magnetic recording and reproducing apparatus, and in particular to apparatus for magnetically recording and reproducing successive high-frequency signals, such as television video signals, by tracing oblique tracks on a magnetic tape. The invention provides adjusting means for the matching of tracks.

Different magnetic recording and reproducing systems generally have different track positions on a magnetic tape. If, therefore, it is desired to use one such system for reproducing material previously recorded on a magnetic tape by another such system, there is a problem of how to match tracks. Specifically, since the angle of inclination of the rotating member varies from one system to another, it often happens that the magnetic heads of one system do not accurately trace the tracks of recorded material on a tape recorded by using another system. This may cause a disturbance in reproducing signals during playback; or it may make playback impossible. This has created the problem of interchangeability of magnetic tapes between various systems for recording and reproducing high-frequency signals. It is possible to record and reproduce signals by using the same system but not by using different systems. It has hitherto been impossible for conventional magnetic recording and reproducing apparatus to effect accurate matching of the tracks of other apparatus. According to the invention, all the magnetic tapes can be made interchangeable by adjusting the angle of inclination of the axis and the height of the rotating member of a magnetic recording and reproducing apparatus. These adjustments meet the standards which are used for reproducing recorded material from a standard magnetic tape on which signals have been recorded in standard tracks by using a standard magnetic recording and reproducing apparatus. During playback, the tracks traced by the magnetic heads of the rotating member of the unadjusted apparatus are made to coincide with all the tracks on the standard tape.

Accordingly, the principal object of this invention is to provide a magnetic recording and reproducing apparatus which permits the matching of tracks on a magnetic tape by using simple adjusting means.

Another object of the invention is to provide a magnetic recording and reproducing apparatus which permits the matching of tracks quickly, positively and easily while the recorded material is being reproduced.

Still another object of the invention is to provide a magnetic recording and reproducing apparatus which permits adjustment of the angle of inclination of the axis of rotation of the rotating member.

These objects will become apparent from consideration of the drawings and the detailed description set forth hereunder, and other objects and advantages of the invention not described hereinabove will become apparent from consideration of the embodiments of the invention described with reference to the drawings, in which.

Figure 1:
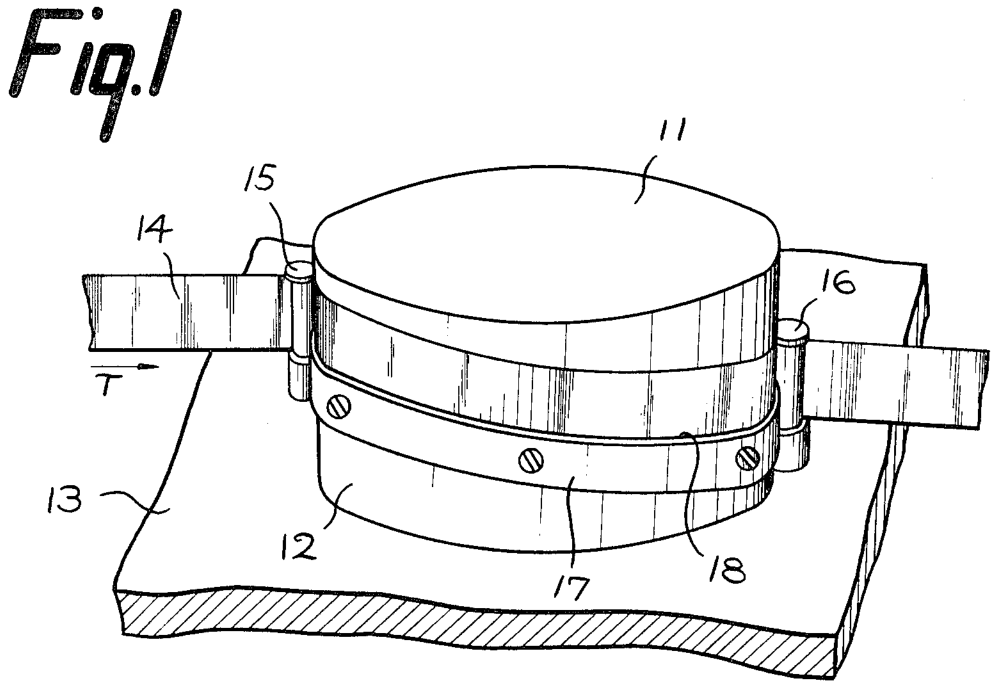
FIG. 1 is a perspective view showing the outer appearance of one embodiment of the apparatus according to this invention.

FIG. 1 shows in a perspective view the outer appearance of one embodiment of the magnetic recording and reproducing apparatus according to this invention. In FIG. 1, the apparatus comprises a magnetic tape guide member assembly consisting of members 11 and 12 of the same outer diameter disposed one above another on the same center axis and spaced apart a small distance from each other. The guide members 11 and 12 are connected together and supported by a baseplate 13. Two magnetic tape guide poles 15 and 16 are disposed on said baseplate 13 on opposite sides of the guide member assembly.

A magnetic tape 14 is pulled in the direction of arrow T. The tape moves past one guide pole 15, travels obliquely along the portion of the outer circumferential surface of the cylindrical guide member assembly 11 and 12 which have no support plate attached thereto, through an angle of rotation of over 180° (under 360°), and past the other guide pole 16.

The lower cylindrical guide member 12 has a guide plate 17 attached to its outer circumferential surface. The tape 14 moves obliquely about the guide member assembly with the lower edge of the tape riding on the upper edge portion 18 of the guide plate 17. The guide plate 17 also serves to restrain the tape 14 against vertical displacement while travelling about the guide member assembly.

The internal structure which forms essential portions of the present invention will be explained with reference to FIGS. 2 and 3 which show one embodiment of the present invention. A rotating member 111 is disposed in a space 110 of predetermined dimensions formed between the two cylindrical magnetic tape guide members 11 and 12. Members 11 and 12 have the same outer diameter, and they are connected together and supported by the support plate 19 in FIG. 2. The member 111 is rotated in the direction of arrow O which is opposite to the direction of arrow T. Member 111 rotates at a predetermined rate higher than the rate of travel of the magnetic tape 14.

In the embodiment shown, magnetic heads 112 and 113, are mounted at predetermined positions diametrically opposed to each other on the peripheral edge of the rotating member 111. These heads obliquely scan the inner surface of the magnetic tape 14, effectively moving from its upper edge to its lower edge as it travels about the outer circumferential surface of the guide member assembly 11, 12.

The rotating member 111 is driven by a driving motor 114 (FIG. 3) which is mounted below the lower guide member 12. A mounting flange 117, having a centering boss 116, is formed integrally with the motor case at the lower end of a rotary shaft 115 of the motor 114. The flange 117 is formed with three openings 121 each for receiving screws 118, 119 and 120 and three threaded openings 125 each for threadably receiving inclination adjusting screws 122, 123 and 124, which are spaced equidistantly from one another as shown in FIG. 2.

The motor 114, is positively retained on a horizontal inner plate 127 of the lower member 12 by inserting the screws 118, 119 and 120 through the openings 121 in the flange 117 and into three threaded openings 126 formed in said inner plate 127. In this condition, the upper ends of the inclination adjusting screws 122, 123 and 124 abut against the underside 128 of the horizontal inner plate 127. It will thus be evident that the angle of inclination of the rotary shaft 115 of the motor 114 can be varied as desired by adjusting each of the inclination adjusting screws 122, 123 and 124.

Formed in the center of the horizontal inner plate 127 is an annular opening 146, for receiving the boss 116, which is surrounded by a centering gasket 129 formed of a hard rubber material. The centering gasket 129 is mounted so that the direction of inclination of the rotary shaft 115 of the motor 114 can be varied on its center line.

The aforementioned rotating member 111 is firmly secured to the rotary shaft 115 by a set screw 130. More specifically, the rotating member 111 is formed with a boss 131 at its lower end. This boss is formed to provide an opening 132 extending vertically therethrough for receiving the rotary shaft 115 therein. The upper portion of opening 132 is threaded to receive a height-adjusting screw 133. Formed transversely in the boss 131 is an opening 135 which threadably receives the set screw 130 as aforementioned. It is now evident that the height of rotating member 111 can be adjusted by rotating the height-adjusting screw 133 fitted in the threaded opening 134.

Apparatus, constructed according to this invention, may be adjusted to match the tracks on a magnetic tape on which signals have been recorded in standard tracks by means of a standard magnetic recording and reproducing apparatus. The standard apparatus had been previously adjusted to meet the standards. The standard tape is then played back on a magnetic recording and reproducing apparatus embodying this invention which is then adjusted to meet the standards. The process of adjustments is described below.

FIGS. 6A, 6B, 6C, 6D, and 6E show tracks on a magnetic tape. In the FIGS. a solid line represents a standard track formed on the magnetic tape 14 by means of a standard magnetic recording and reproducing apparatus. The broken lines *a*, *b*, *c*, *d* and *e* represent tracks which could actually be traced by magnetic heads when a recording is made by using a magnetic recording and reproducing apparatus that has not been adjusted to meet the standards.

It will be apparent that if the tracks traced by the magnetic heads of unadjusted recording and reproducing apparatus deviate from the standard tracks traced by the magnetic heads of adjusted apparatus, it will be impossible to reproduce signals faithfully. When the deviation is of high degree, it is impossible to reproduce recorded materials. It is thus necessary to adjust the magnetic recording and reproducing apparatus so as to match the tracks *a*, *b*, *c*, *d* and *e* with the standard tracks.

In effecting adjustments, a standard magnetic tape on which standard tracks are formed is mounted on a magnetic recording and reproducing apparatus (embodying this invention) which is to be adjusted. The tape is run and the member 11 is rotated by means described above. When the tracks traced by the magnetic heads 112 and 113 attached to the rotating member deviate from the standard track *s* [as shown at *a* in FIG. 6A], the angle of inclination of the rotary shaft 115 of the motor is varied to adjust the inclination of the rotating member 111, thereby varying the traces of magnetic heads 112 and 113.

Figure 2:
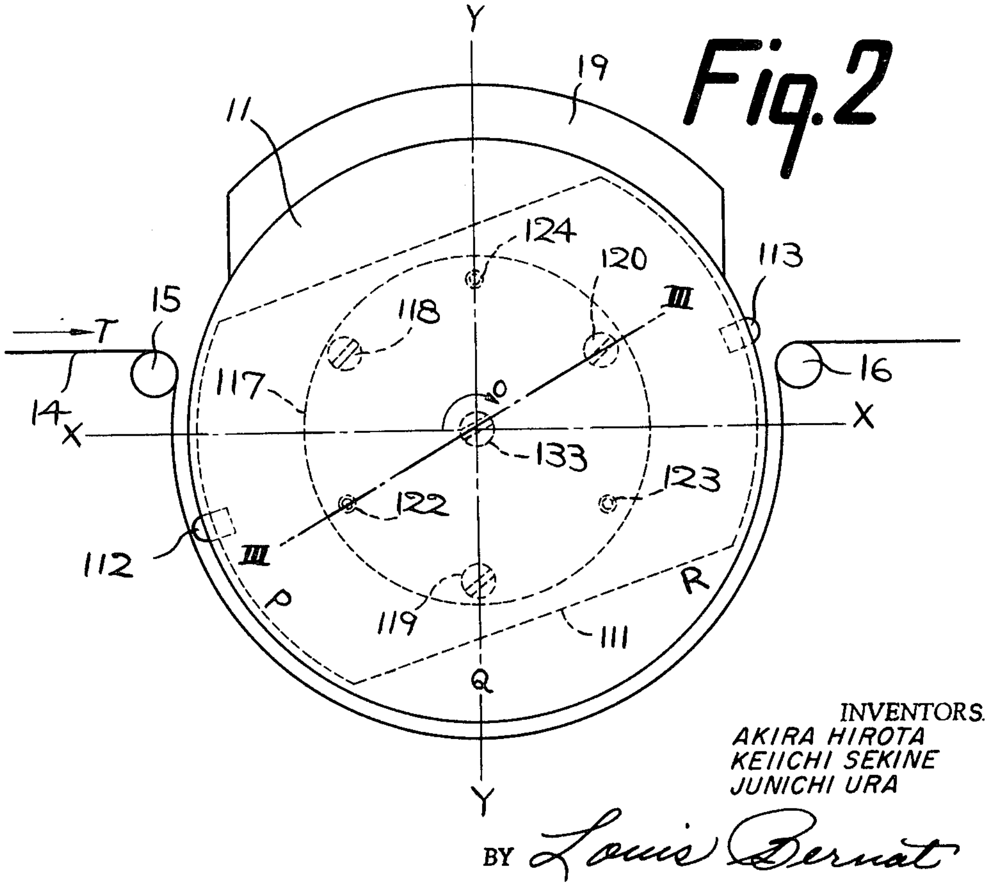
FIG. 2 is a schematic plan view showing one embodiment of the apparatus according to this invention.
Figure 3:
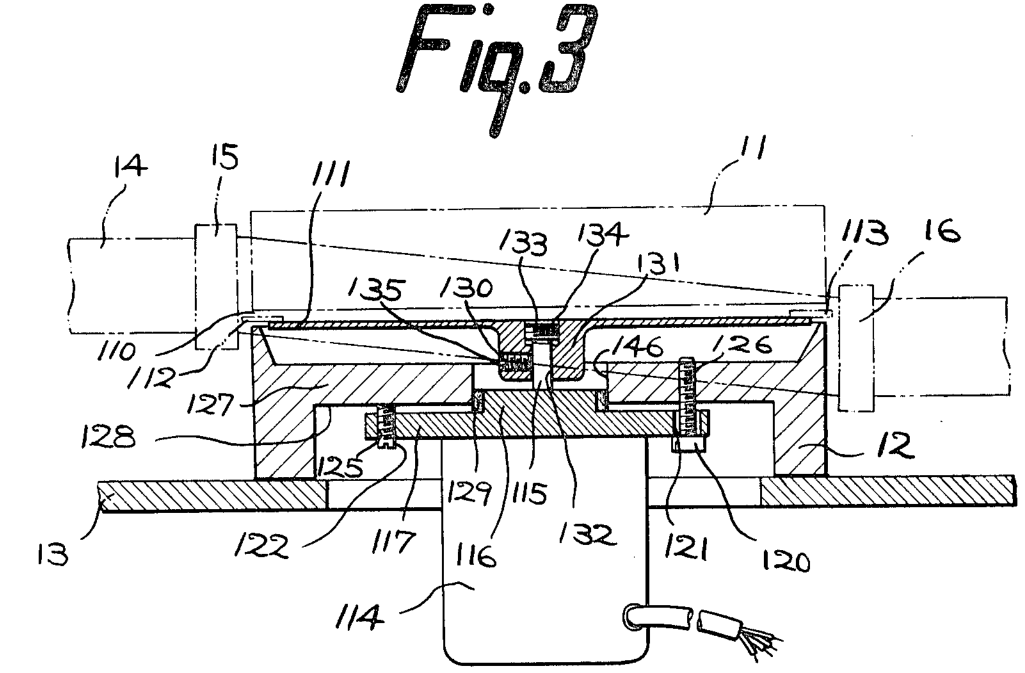
FIG. 3 is a schematic longitudinal sectional view on the line III–III of FIG. 2.

More specifically, the inclination adjusting screws 122 and 123 may be loosened, and the inclination of the rotating member 111 may be adjusted with a horizontal symmetrical axis Y–Y as the center as shown in FIGS. 2 and 3. The adjustment is made to obtain an optimum (maximum) output while observing the waveform of reproduced output of the magnetic heads as by a synchroscope. When the maximum output is attained (the track *a* substantially coincides with the track *s*), the set screws 118 and 120 are tightened to fix the driving motor 114 to the horizontal inner plate 127.

Figure 6:
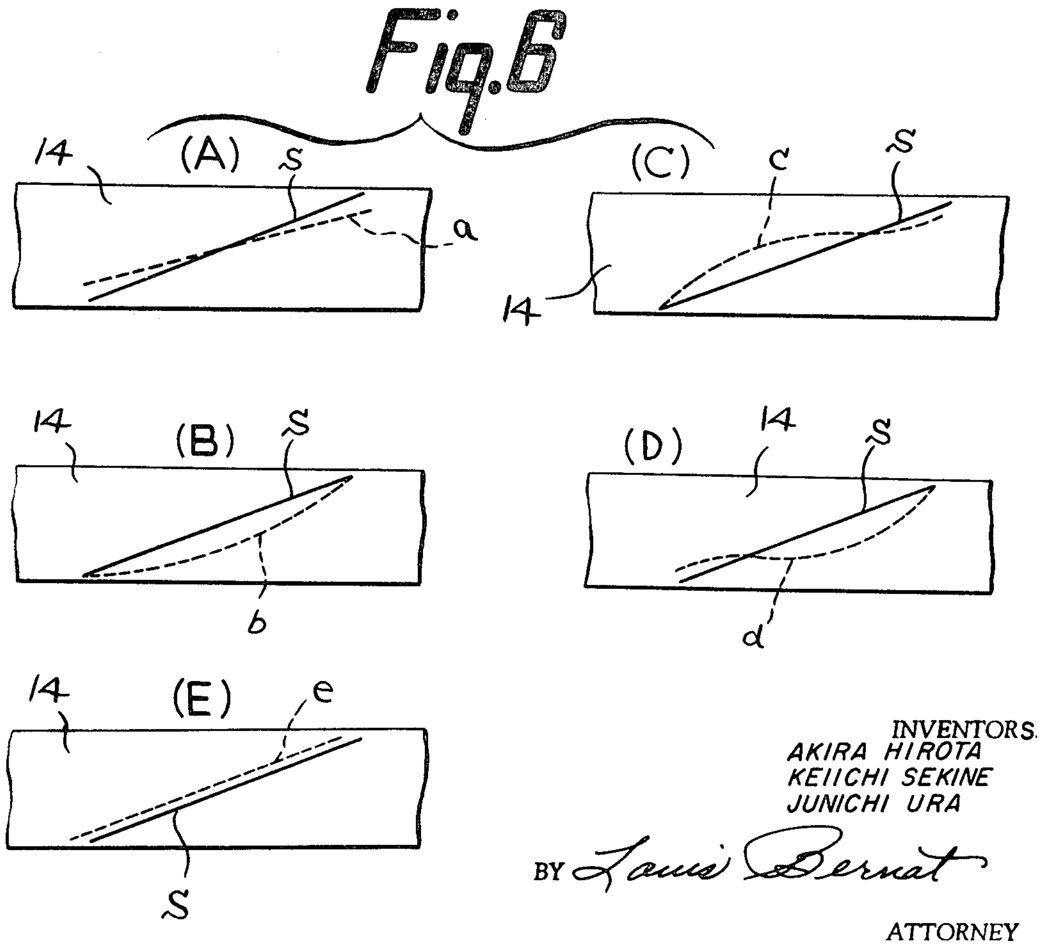
FIG. 6A, 6B, 6C, 6D, and 6E, are diagrams showing tracks on a tape in explanation of the present invention.

When the tracks *b* traced by the magnetic heads deviate from the standard track *s* (as shown in FIG. 6B, the portion Q of the rotating member is downwardly displaced in FIG. 2. The inclination adjusting screws 122, 123 may be loosened, and the inclination of the rotating member 111 may be adjusted about a symmetrical axis X–X. When the track *b* substantially coincides with the track *s*, the set screw 119 is tightened.

When the tracks *c* traced by the magnetic heads deviate from the standard track *s* as shown in FIG. 6C, the portion P of the rotating member is downwardly displaced as seen in FIG. 2. The inclination adjusting screw 122 may be loosened while adjusting the inclination of the rotating member 111. When the track *c* substantially coincides with the track *s*, the set screws 118 and 119 are tightened.

When the tracks *d* traced by the magnetic heads deviate from the standard track *s* as shown in FIG. 6D, the portion R of the rotating member is downwardly displaced as seen in FIG. 2. The inclination adjusting screw 123 may be loosened while adjusting the inclination of the rotating member 111. When the track *d* substantially coincides with the track *s*, the set screws 119 and 120 are tightened.

It is now evident that the tracks traced by the magnetic heads 112 and 113 of the rotating member 111 can be made to coincide with the standard tracks positively, readily and quickly. The inclination of the rotating member 111 is adjusted by the three set screws 118, 119 and 120 and the three inclination adjusting screws 122, 123 and 124. In effecting inclination adjustments as aforementioned, there is a possibility that the position of the rotating member 111 is displaced vertically. When this happens, the set screw 130 may be loosened and the vertical position of the rotating member 111 may be changed by adjusting the height adjusting screw 133. This permits vertical movement of the rotating member 111 in the axial direction, so that positioning of the magnetic heads 112 and 113 attached to the rotating member 111 can be readily effected.

If the set screw 130 is tightened adequately upon completion of all the aforementioned adjustments, no further adjustments are required. It goes without saying that all the aforementioned adjustments are effected while observing the wave form of a reproduced output by means of a measuring instrument, such as a synchroscope.

Figure 4:
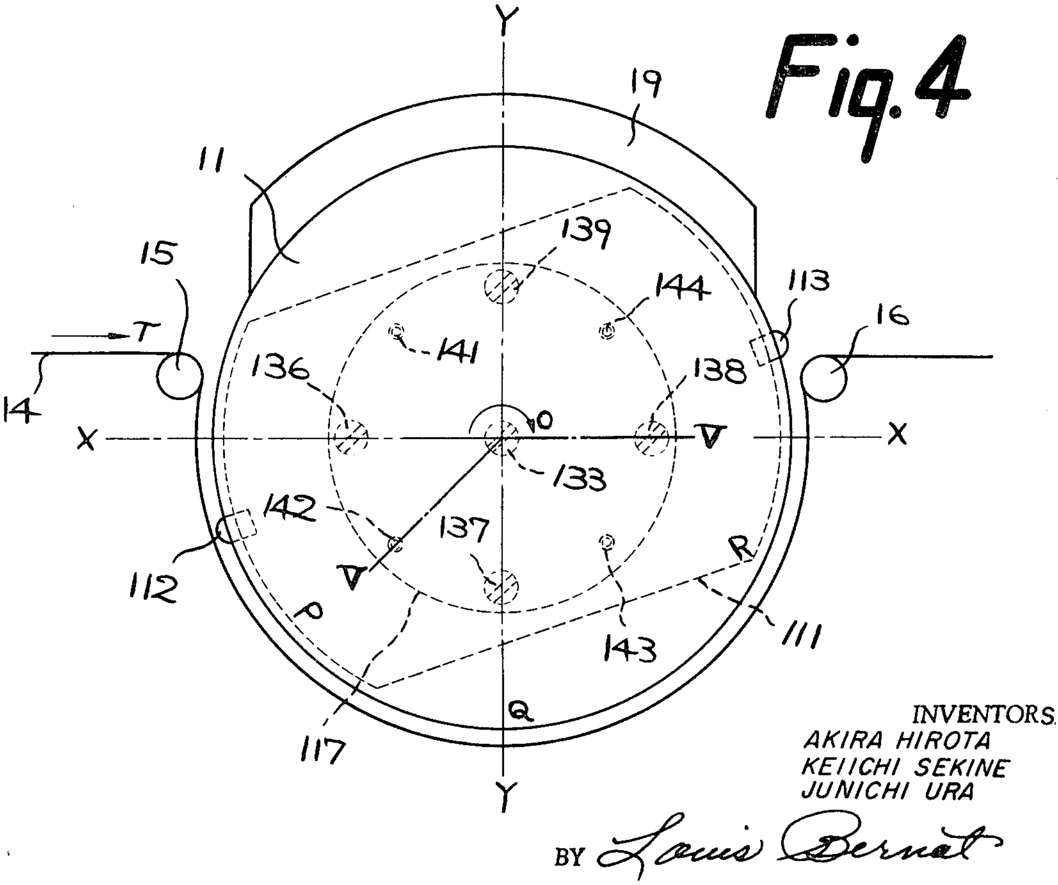
FIG. 4 is a schematic plan view showing another embodiment of the apparatus according to this invention.
Figure 5:
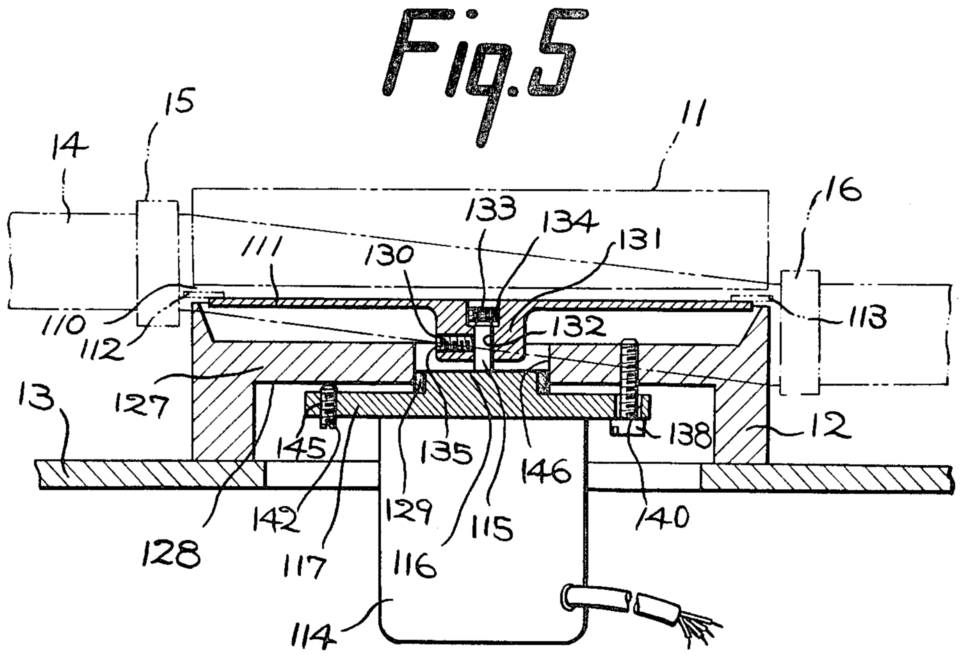
FIG. 5 is a schematic longitudinal sectional side view on the line V–V of FIG. 4.

FIGS. 4 and 5 show another embodiment of this invention. In FIGS. 2, 3, 4 and 5, like reference characters designate similar parts in all the drawings. Description of these parts shall therefore be omitted. In the present embodiment, four inclination adjusting screws and four set screws are used instead of three inclination adjusting screws and three set screws as in the preceding embodiment.

More specifically, the flange 117 of the driving motor 114 is formed with four openings 140 for receiving therein four set screws 136, 137, 138 and 139 and four threaded openings 145 for threadably receiving therein four inclination adjusting screws 141, 142, 143 and 144. These openings are disposed equidistantly from one another, at predetermined positions. The inclination of the rotating member is adjusted by adjusting these two sets of screws. The process of adjustments is described hereinbelow.

When the tracks *b* traced by the magnetic heads 112 and 113 deviate from the standard track *s* as shown in FIG. 6B, the portion Q of the rotating member is downwardly displaced as seen in FIG. 4. The inclination adjusting screws 142 and 143 may be loosened, and the set screw 137 may be tightened. Then the set screws 139 may be loosened to rotate the inclination adjusting screws 141 and 144, whereby the inclination of the rotating member 111 can be adjusted with a horizontal symmetrical axis X–X as the center. This allows the track *b* to substantially coincide with the track *s*.

When the tracks *c* traced by the magnetic heads 112 and 113 deviate from the standard track *s* as shown in FIG. 6C, the portion P of the rotating member is downwardly displaced as seen in FIG. 4. The inclination adjusting screw 142 may be loosened, and the set screws 136 and 137 may be tightened. Then the set screws 138 and 139 may be loosened to rotate the inclination adjusting screw 144, whereby the inclination of the rotating member 111 can be adjusted. This allows the track *c* to substantially coincide with the track *s*.

When the tracks *d* traced by the magnetic heads 112 and 113 deviate from the standard track *s* as shown in FIG. 6D, the portion R of the rotating member is downwardly displaced as seen in FIG. 4. The inclination adjusting screw 143 may be loosened, and the set screws 137 and 138 may be tightened. Other suitable screws may be adjusted, whereby the inclination of the rotating member can be adjusted. This allows the track *d* to substantially coincide with the track *s*.

When the tracks traced by the magnetic heads 112 and 113 deviate from the standard track *s*, as shown at *e* in FIG. 6E, in such a manner that they are parallel with the track *s* but are displaced above or below the track *s*, the inclination of the rotating member substantially coincides with that of the standard track. The set screw 130 may be loosened, and the height adjusting screw 133 may be adjusted, whereby the rotating member can be moved upwardly or downwardly to make the track *e* coincide with the track *s*.

While the present invention has been shown and described with reference to particular embodiment thereof, it is to be understood that the invention is not to be limited thereto, and that many changes and modifications may be made therein without departing from the spirit of the invention.

We claim:

1. A magnetic recording and reproducing apparatus comprising a cylindrical magnetic tape guide member assembly including two guide members of the same outer diameter disposed one above the other on the same center axis and spaced apart to define an annular space therebetween, a rotating member having magnetic heads mounted on its peripheral edge and rotatable in said annular space, said rotating member being coaxially supported between said cylindrical magnetic tape guide members, a magnetic tape maintained obliquely along the outer circumferential surface of said cylindrical magnetic tape guide member assembly for movement in a predetermined direction, means for adjusting the height of said rotating member within said annular space, a motor in a case having a flange thereon for rotating said rotating member, means for moving said magnetic tape about the cylindrical magnetic tape guide member assembly along its outer circumferential surface so that said magnetic heads scan the magnetic tape to form oblique tracks thereon, and inclination-adjusting means for independently adjusting in each of three mutually perpendicular axes of motion an angle and a direction of inclination of an axis of rotation of said rotating member so that the tracks formed on the magnetic tape by the magnetic heads coincide with a standard track pattern formed on the magnetic tape, wherein said inclination adjusting means comprises at least three inclination-adjusting screws threadably received in openings formed in and disposed equidistantly from one another on the periphery of said flange of said motor case, the outside ends of said screws being abutted against the cylindrical magnetic tape guide member assembly, and said height-adjusting screw threadably received in a threaded opening formed in a boss extending downwardly from said rotating member in the center thereof, said threaded opening being disposed above an opening for receiving therein a rotary shaft of said motor for driving the rotating member and maintaining communication therewith, said height adjusting screw extending through the opening in said boss and the opening for receiving said rotary shaft, said height adjusting screw abutting against the upper end of said rotary shaft.